United States Patent
Dunn et al.

(10) Patent No.: US 6,463,144 B1
(45) Date of Patent: *Oct. 8, 2002

(54) INTERNET TELEPHONY CALLBACK SYSTEM AND METHOD OF OPERATION

(75) Inventors: James M. Dunn, Fresno, CA (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 09/707,981

(22) Filed: Nov. 8, 2000

Related U.S. Application Data

(63) Continuation of application No. 09/050,008, filed on Mar. 30, 1998, now Pat. No. 6,169,795.

(51) Int. Cl.[7] ............... H04M 3/42; H04L 12/66
(52) U.S. Cl. ............... 379/210.01; 370/352
(58) Field of Search ............... 379/209.01, 210.01, 379/211.01, 201.01, 207.02; 370/252, 352, 431; 709/201, 227, 238

(56) References Cited

U.S. PATENT DOCUMENTS

| | | | | |
|---|---|---|---|---|
| 4,313,036 A | * | 1/1982 | Jabara et al. | 370/352 |
| 5,027,387 A | * | 6/1991 | Moll | 379/114.01 |
| 5,327,486 A | | 7/1994 | Wolff | 379/96 |
| 5,351,237 A | | 9/1994 | Shinohara et al. | 370/58.3 |
| 5,425,091 A | | 6/1995 | Josephs | 379/201 |
| 5,590,181 A | | 12/1996 | Hogan et al. | 379/114 |
| 5,664,010 A | | 9/1997 | Walker et al. | 370/207 |
| 5,689,550 A | | 11/1997 | Garson et al. | 379/89 |
| 5,884,032 A | * | 3/1999 | Bateman et al. | 370/356 |
| 6,169,795 B1 | * | 1/2001 | Dunn et al. | 370/352 |

FOREIGN PATENT DOCUMENTS

| | | |
|---|---|---|
| WO | WO 97/16916 | 5/1997 |

* cited by examiner

*Primary Examiner*—Ahmad F. Matar
*Assistant Examiner*—Benny Q. Tieu
(74) *Attorney, Agent, or Firm*—Joseph C. Redmond, Jr.; Morgan & Finnegan, LLP

(57) ABSTRACT

A system and method to implement callback for unanswered telephone calls in a Distributed Information System (DIS) adapted for telephony. A calling station and a called station are each connected to the DIS through a local and remote service provider, respectively, each provider including a voice gateway and callback server. A telephone call originated at the calling station by a calling party is processed by the local service provider and the local callback server generates a control message which accompanies the telephone call. The remote service provider processes and connects the telephone call if answered by the called party and sends a message to delete the control message from the local callback server. If the telephone call is unanswered the remote callback server stores the control message and waits for the called party to initiate a return call. When the return call is initiated, the remote callback server sends a message to the local callback server to extend the return call to the calling party. If the calling party is busy or unavailable, the roles of the local and remote callback servers are reversed. The remote (formerly the local) callback server stores the message and initiates a return reply message when the called (formerly the calling) party generates message.

21 Claims, 8 Drawing Sheets

INTERNET TELEPHONY CALLBACK SYSTEM AND METHOD OF OPERATION

This is a continuation of application Ser. No. 09/050,008, filed Mar. 30, 1998, now U.S. Pat. No. 6,169,795.

BACKGROUND OF THE INVENTION

1. Field of the Invention

This invention relates to communication systems and methods of operation. More particularly, the invention relates to a distributed information system (DIS), e.g., the Internet, and methods of operation providing telephony with callback for subscribers in a Public Switched Telephone System.

2. Description of Prior Art

In the current environment it is possible to place voice calls over a data network such as the Internet. Such calls were originally restricted to using one personal computer to call another personal computer, with no ability to call a regular telephone in a Public Switched Telephone Network (PSTN). Recently, Voice Gateways have been added to the Internet which bridge between the data network and the voice networks in the PSTN. However, such Voice Gateways do not support standard enhanced telephony features such as returning the last unanswered call or callback. Complicating this problem is the fact that Internet users are often given temporary addresses and identifications by their Internet Service Providers (ISP) using a feature called Dynamic Host Protocol (DHCP). Thus, returning a call from a PSTN phone to an Internet user contains different problems depending on whether the user is still logged on at the originally assigned ISP address or if the user has logged off, and that ISP address has been reassigned to a different user. Accordingly, a need exists to expand Telephone service on the Internet to interconnect users and subscribers in a PSTN while providing users and subscribers with callback without impact from DHCP.

Prior art related to telephone service and the Internet includes the following:

PCT published application WO 97/16916, published May 9, 1997, and filed Nov. 1, 1995, discloses a method and apparatus for communicating audio information over a computer network. A standard telephone connected to a PSTN can communicate with any other PSTN connected telephone using a computer network such as the Internet as the transmission facility instead of conventional telephone transmission facilities. The caller dials the number of an access port or the computer network and transmits the number of the called party when connected to the port. The port receives the number of the called party and establishes a two-way, full duplex communication link via the computer network to a corresponding remote access port or specialized computer system in the vicinity of the called party. The port at the receiving end is connected to the local PSTN in the region of the called party and uses the local PSTN to connect the call to the called party. The communication protocols used by the computers on the internet to communicate information include TCP (Transmission Control Protocol) and UDP (User Datagram Protocol). Both the TCP and UDP protocols are built on top of a lower layer protocol known as the IP (Internet Protocol). IP is used to format and route TCP and UDP messages.

U.S. Pat. No. 5,425,091 issued Jun. 13, 1995, discloses automatic customer callback implemented directly into service logic of an Advanced Intelligent Network (AIN). The AIN includes a central office switch which is in communication with a service control point, at least one calling party, and at least one called party. The AIN components preferably communicate with one another through Transaction Capability Application Part (TCAP) signalling protocol and are directed for use in a AIN 0.2 network. An adjunct processor such as an Intelligent Peripheral (IP)) is in communication with the central office switch. In operation, digits dialed by the calling party are collected as well as the calling party's telephone number. If the called party is busy, the calling party activates the automatic customer callback service, the subscriber telephone line will be monitored to detect an idle condition. Once this condition is detected, a call may be originated from the adjunct processor to the subscriber whereupon a message may be played for receipt by the subscriber advising the same of the need to callback the calling party who activated the automatic customer callback.

U.S. Pat. No. 5,351,237 issued Sep. 27, 1994, discloses a plurality of Local Area Networks (LAN) connected to an Integrated Services Digital Network (ISDN) via a plurality of routers, each of which includes a table for routing information. Each router sets local router information and main/sub-setting information. Each sub-router sets main-router information which is written in the table. Each sub-router sends an inquiry packet including the local router information to the main router. The main router receives the inquiry packet, enters the local router information in the table, and sends to each sub-router a reply packet including the local router information stored in the table. Each sub-router receives a reply packet and enters the local router information in the table. On the basis of the router information stored in the table each router renews routing information.

None of the prior art, alone or in combination, shows or suggests a distributed information system, e.g., the Internet, with expanded telephone service including callback between the users and subscribers in a PSTN without impact from DHCP protocol problems.

SUMMARY OF THE INVENTION

An object of the invention is a distributed information system and method of operation with improved telephone service between users and subscribers in a PSTN.

Another object of the invention is a distributed information system, e.g., the Internet, and method of operation with improved telephone service including callback.

Another object is a distributed information system and method of operation with improved telephone service between users and subscribers in a PSTN without impact from dynamic host protocol problems and the system.

Another object is a distributed information system and method of operation with improved telephone service in displaying to a call originator the fact that a call has been queued in a return call machine at the called party.

Another object is a distributed information system and method of operation with improved telephone service in generating call profiles to solve the problem of dynamic host protocols.

Another object of the invention is a distributed information system and method of operation with improved telephone service indicating a return call to a calling party as a returned call.

These and other objects, features and advantages are achieved in a distributed information system, e.g., the Internet, adapted for telephony including callback for unanswered telephone calls between a user and a subscriber in a Public Switch Telephone Network. A calling station in the distributed information system (DIS) and a called station in the Public Switch Telephone Network (PSTN) are each connected to the DIS through a local and remote service provider, respectively. Each provider includes a voice gateway and a callback server. A telephone call originated at the calling station by a calling party is processed by the local service provider and the local callback server generates a control message which accompanies the telephone call. The remote service provider when the return call is initiated, even though the address of the called party and the DIS may have changed, the remote callback server sends a message to the local callback server which identifies the latest address for the called party and extends the return call to the calling party. If the calling party is busy or unavailable, the roles of the local remote callback servers are reversed. The remote (formerly the local) callback server stores the message and initiates a return reply message when the called party (formerly the calling party) generates the message.

DESCRIPTION OF DRAWING

The invention will be further understood from the following detailed description of preferred embodiment taken in conjunction with the appended drawing, in which.

DESCRIPTION OF PREFERRED EMBODIMENT

Figure 1:
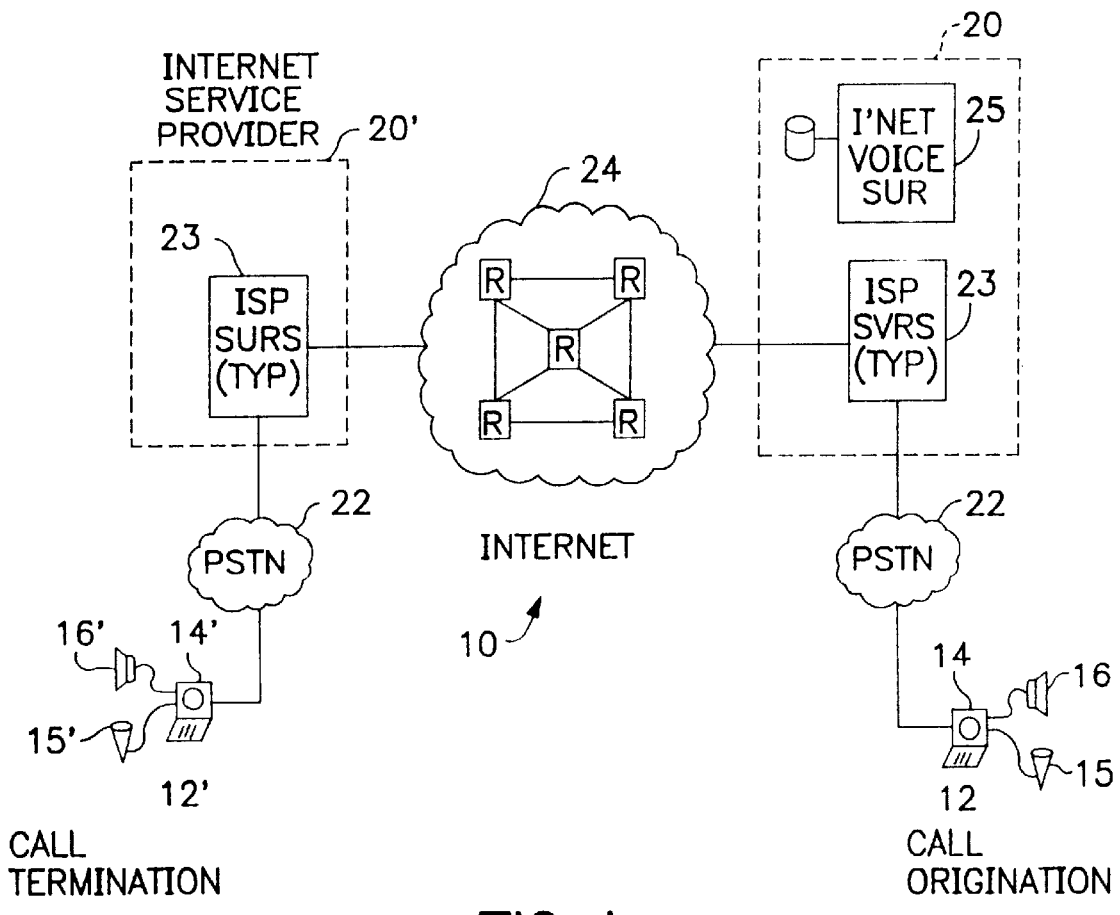
FIG. 1 is a block diagram of a prior art distributed information system providing telephone service for calls originated and terminated by users connected to the system.

FIG. 1 shows a portion of a distributed information system 10, e.g., the Internet, providing voice and data communications between users 12 and 12' coupled to the Internet 10 through computers 14 and 14'. Both computers 14, 14' include sound cards (not shown) coupled to microphones 15 and 15' along with speakers 16 and 16', The Internet 10 is well documented in the text, "The Internet Unleashed" published by Sams Publishing, a division of McMillan Computer Publishing, Indianapolis, Ind., 1994 (ISBN-0-672-30466X). Each computer is coupled to an Internet Service Provider (ISP) 20, 20' through a local Public Switch Telephone Network (PSTN) 22. Each ISP includes a server 23 for recognizing an incoming Internet call and providing the computer access to the internet by a dial-up connection through the local PSTN. Each individual connection to the Internet is made through a series of interconnected routers 24, such as part number Cisco 4000 available from Cisco of Menlo Park, Calif. Voice communication from a call origination computer to a call termination computer is established by digitizing voice messages of a calling party into data packets and transmitting the data packets to the called party through the Internet after access to the Internet by the ISP serving the call origination and call termination parties. An Internet voice server 25 identifies and assists in the establishment of the connection between the call origination party 12 and the call termination party 12'. The routers 24 direct the voice packets from the call origination party to the call termination party to enable a call to originate at either a computer or a telephone and terminate the call at she other type of instrument.

Two problems presently exist with distributed information systems providing telephone service to subscribers of Plain Old Telephone Service (POTS) and data terminal equipment, i.e., computers connected to the Internet. First, all calls placed over the Internet, whether originated or terminated on a personal computer (PC) or a POTS phone must be answered while the originator is still on the line. There is no provision or capability for a call to be unanswered and returned at a later time by the called party. Second, the Internet servers 23 assign users a "temporary address" assigned by their Internet Service Provider using a protocol known as Dynamic Host Configuration Protocol (DHCP). DHCP is disclosed in an Internet Draft Standard RFC 2131 published by the Internet Engineering Task Force. In originating a call, the call originator must be identified by more than its Internet address. Using Time of Day (TOD) is useful, but not sufficient since many Internet Service Providers are not time synchronized. The Dynamic Host Configuration Protocol (DHCP) provides a mechanism for dynamic assignment of IP addresses to host, for delivery of addresses to host through an IP network and for delivery of other configuration parameters such as sub-net mask and default router. RFC 2132 lists options for the "options field" of DHCP messages. Other RFC's and internet documents are available from the Internet Documentation Server.

Using the Internet set or protocols (TCP/IP), each machine that can connect to the Internet needs a unique IP address. When an organization sets up its computer users with a connection to the Internet, an IP address must be assigned to each machine. Without DHCP the IP address must be entered manually at each computer and, if computers move to another location in another part of the network, a new IP address must be entered. DHCP lets a network administrator supervise and distribute IP addresses from a central point and automatically send a new IP address when a computer is plugged into a different place in the network.

DHCP uses the concept of a "lease" or amount of time that a given IP address will be valid for a computer. The lease time can vary depending on how long a user is likely to require the Internet connection at a particular location. It is especially useful in education and other environments where users change frequently. Using very short leases, DHCP can dynamically reconfigure networks in which there are more computers than there are available IP addresses. DHCP supports static addresses for computers containing Web Servers that need a permanent IP address.

DHCP is an alternative to another network IP management protocol, BOOTP (Bootstrap Protocol). DHCP is a more advanced protocol, but both configuration management protocols are commonly used. Some organizations use both protocols, but understanding how and when to use them in the same organization is important. Some operating systems, including Windows NT, come with DHCP servers. A DHCP or BOOTP client is a program that is located in (and perhaps downloaded) to each computer so that it can be configured.

Figure 2:
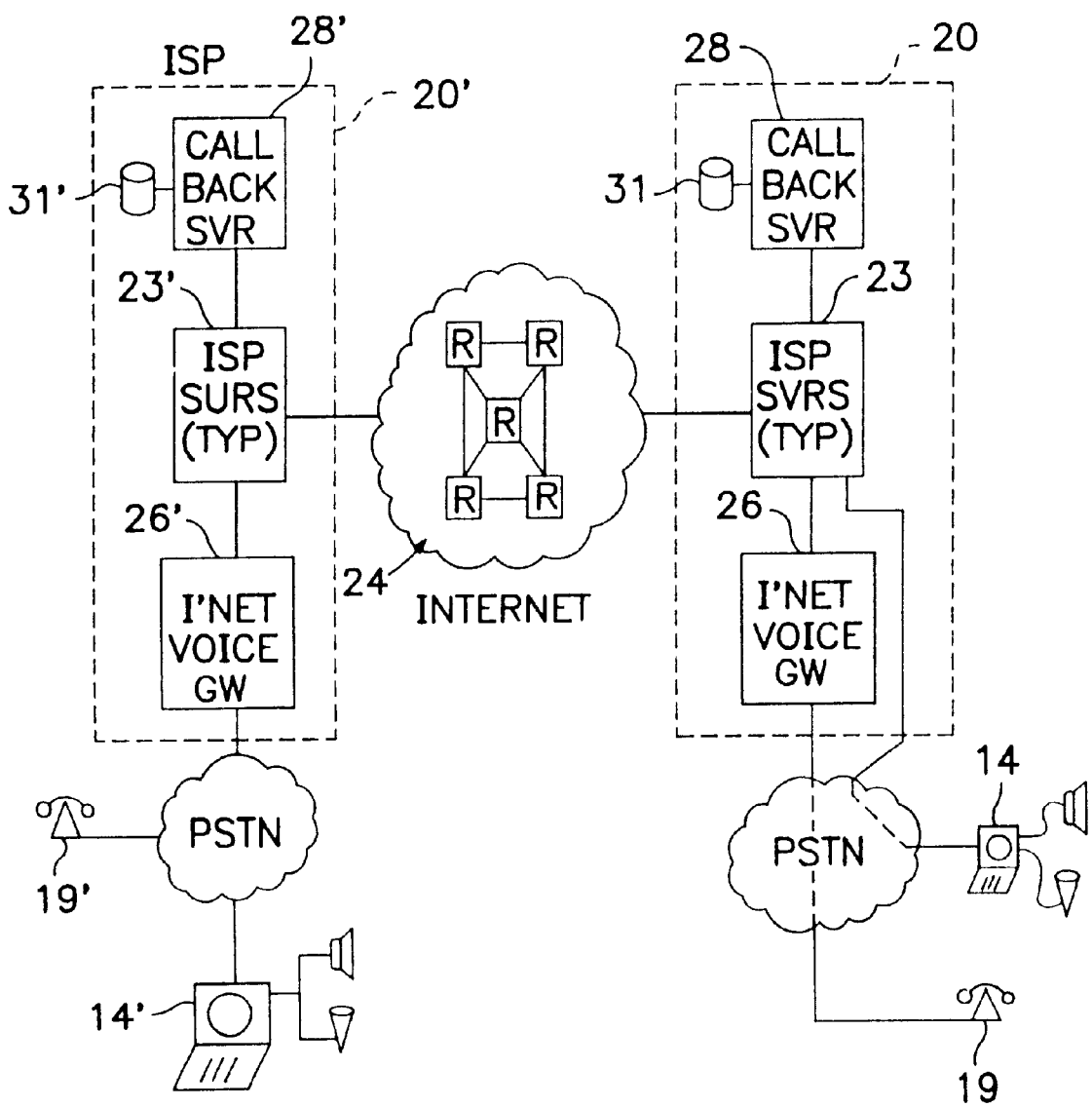
FIG. 2 is a block diagram of a distributed information system providing telephone service between users and subscribers in a PSTN with callback between the called party and the calling party and incorporating the principles of the present invention.

FIG. 2 shows a system which solves the problems of unanswered calls and DHCP in the Internet in Providing telephone service between users of the Internet and subscribers to PSTN using telephones 19 and 19'. FIG. 2 shows the network of FIG. 1 with an Internet voice gateway 26 and a new server 28 called a Callback Server at both the originating and the terminating ISP locations. The Interne voice gateway 26 transforms the analog voice into voice packets and vice-a-versa. The voice gateway is a server available from several manufacturers including VocalTec, Northvale, N.J.; NetSpeak, Boca Raton, Fla. and Lucent Technologies, Inc., Murray Hill, N.J. The gateway 26 maps standard telephone style calling numbers to Internet style addresses and performs the cross-connection between the two networks. The network uses either TCP/IP or UDP/IP to communicate voice data over the internet. An advantage to using UDP/IP is that protocols require less transmission overhead resulting in faster data transmission. The internet views the UDP voice packets as simply more data and has no inherent knowledge of the voice nature of the traffic. The voice gateway and its, associated directory is a server sold by several manufacturers.

The callback server 20 and its functions are a focus of the invention. The callback server may be in hardware or software form. In a hardware form, the callback is processor driven and performs similar function to a an Internet server. More specifically, the callback server recognizes users based on profiles stored in a data base and executing call back from unanswered call in accordance with instruction specified in the user profile. Alternatively, the callback server may be software stored in an Internet server and shares the Internet server processor to execute instructions contained in the user profile for handling callback.

With respect to DHCP, the problem is solved by the use of a generated sequence number provided by an originator callback server in which the number may, or may not, be random in nature. The sequence number when coupled with TOD and the user ID at that time provides a unique call identifier. If a call is unanswered, and the data is later returned to the originator by the terminating ISP, the originator ISP checks its local database for the call details. When a match is found, the originator ISP would extend the returning call, based on user delivery preferences to the original caller. Identification of the returning call is desirable based on the capability of the delivery means selected (e.g., a name could be displayed on the PC if the called party is logged on or a caller ID could be displaced on a telephone caller ID device).

Now turning to the callback server, there are two basic functions performed depending on whether the server's position is in the originating ISP location or the terminating ISP location. For the callback function to work properly, there must be at least one server at each end of the session. Also, the callback server does not handle actual voice packets, only control information about those voice packets. The voice packets flow through the internet server as they do today.

Figure 3A:
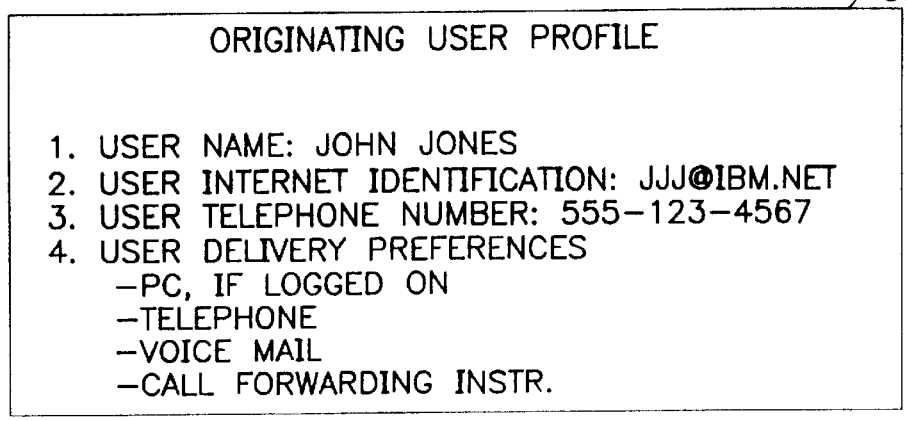
FIG. 3A is a representation of a profile of a call originator user stored in a callback server included in the system of FIG. 2.
Figure 3B:
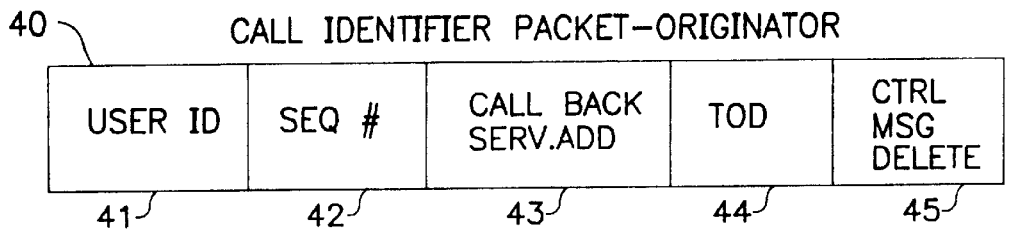
FIG. 3B is a representation of a control frame accompanying a call originated by a calling party to a called party in the system of FIG. 2.

On a call originating end, the callback server enters a User Profile 30, as shown in FIG. 3A, in storage unit 31, and sends a new control message 32, as shown in FIG. 3B, that allows the far end server to remember sufficient details about the call, such that if the call goes unanswered, the far end server can help return the call at a later time. A typical example of a control profile 30 shown in FIG. 3A includes a line 1 containing the name of the calling party which is obtained from the caller identification number accompanying the call. Line 2 includes the Internet address which is provided by he calling party at the time a service request is submitted for callback, if the call is not answered. Line 3 includes the user telephone number which is obtained at the time callback service is requested. Line 4 includes user delivery preferences for callback, such as: a callback notice if the computer is logged on; activating the telephone; providing an entry in the user voice mail; and forwarding the callback notice to another location.

In FIG. 3B, a callback control packet 40 which accompanies a voice message to a called party contains a calling party user ID 41, a message sequence number 42, a callback server address 43, and a time of day 44 which may be optional. The control message may also include a field 45 for control message delete if the call is answered. Terminating callback server uses this field to delete the control message when the call is answered.

Figure 4A:
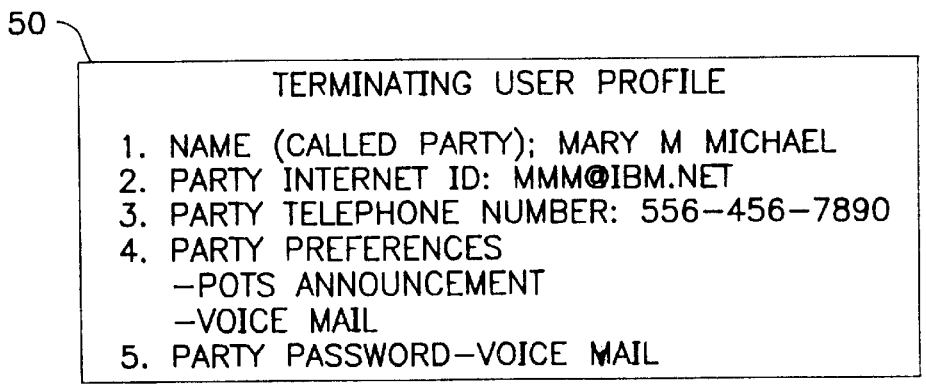
FIG. 4A is a representation of a terminating user profile stored in a callback server servicing the terminating user in the system of FIGS. 2.

In FIG. 4A, a terminating user profile is contained in a record 50 stored in the callback server serving the called party. The record contains a line 1 identifying the name of the returning call party which is obtained from the calling party identification number. Line 2 contains the user ID which is obtained from the ISP translation of the calling party identification number. Line 3 contains the telephone number of the called party. Line 4 contains the preferences for calls missed, such as announcement to POTS phones or voice mail. Line 5 contains the user password for telephone company voice mail. The record 50 is stored in the server serving the called party.

Figure 4B:
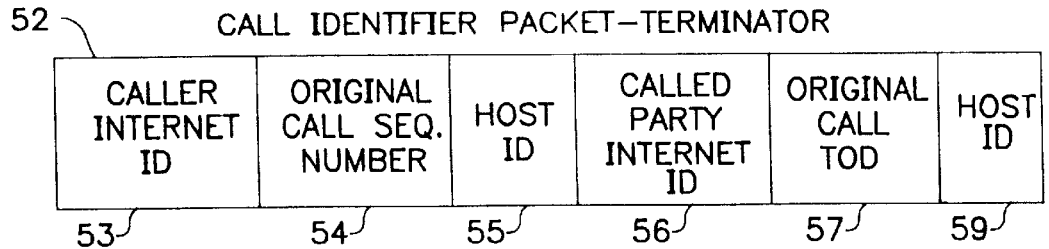
FIG. 4B is a representation of a control message in frame format for a return call identifier from a terminating subscriber to a call originator in the system of FIG. 2.

In FIG. 4B, a control message accompanying a return call is generated in a packet 52 containing the original caller ID 53, the original call sequence number 54 (which in this instance corresponds to the sequence number in field 42 of the packet 40—See FIG. 3B), the host ID of he original callback server 55, the user ID of the returning caller 56, the time of day of the original call 57, and the host ID of the current callback server. When the terminating callback server sees that an incoming call is unanswered, the call control message 40 is saved by the server. The data is paired with a user profile 50 identifying the called party. Eventually, the terminating callback server will receive an incoming message from the end user asking to return unanswered calls. The request may come from a PC using a log-on to the ISP with a suitable screen message being sent to the ISP or the request may come from a POTS phone that has dialed the ISP and is prompted to select a message to return. The message could occur interactively while listening to voice mail or as a separate function based on the simple recitation of stored message data identifying the original call. When the request for callback occurs, the callback server for the terminating user constructs a call return message 52 addressed to the originator's ISP. The message is used to identify a call placed in the past, and connect the caller to the originator if possible. A return call message is used to accomplish this function. A typical message is shown in FIG. 4B and contains data extracted from the original call control message 40 (FIG. 3B) and the current user profile 50 (FIG. 4A). At this point, the original call party has returned a call to the original calling party, and the voice packets are handled by the Internet. The Internet voice gateway server 26 on either or both ends, depending on whether one end or both uses a POTS phone.

Figure 5A:
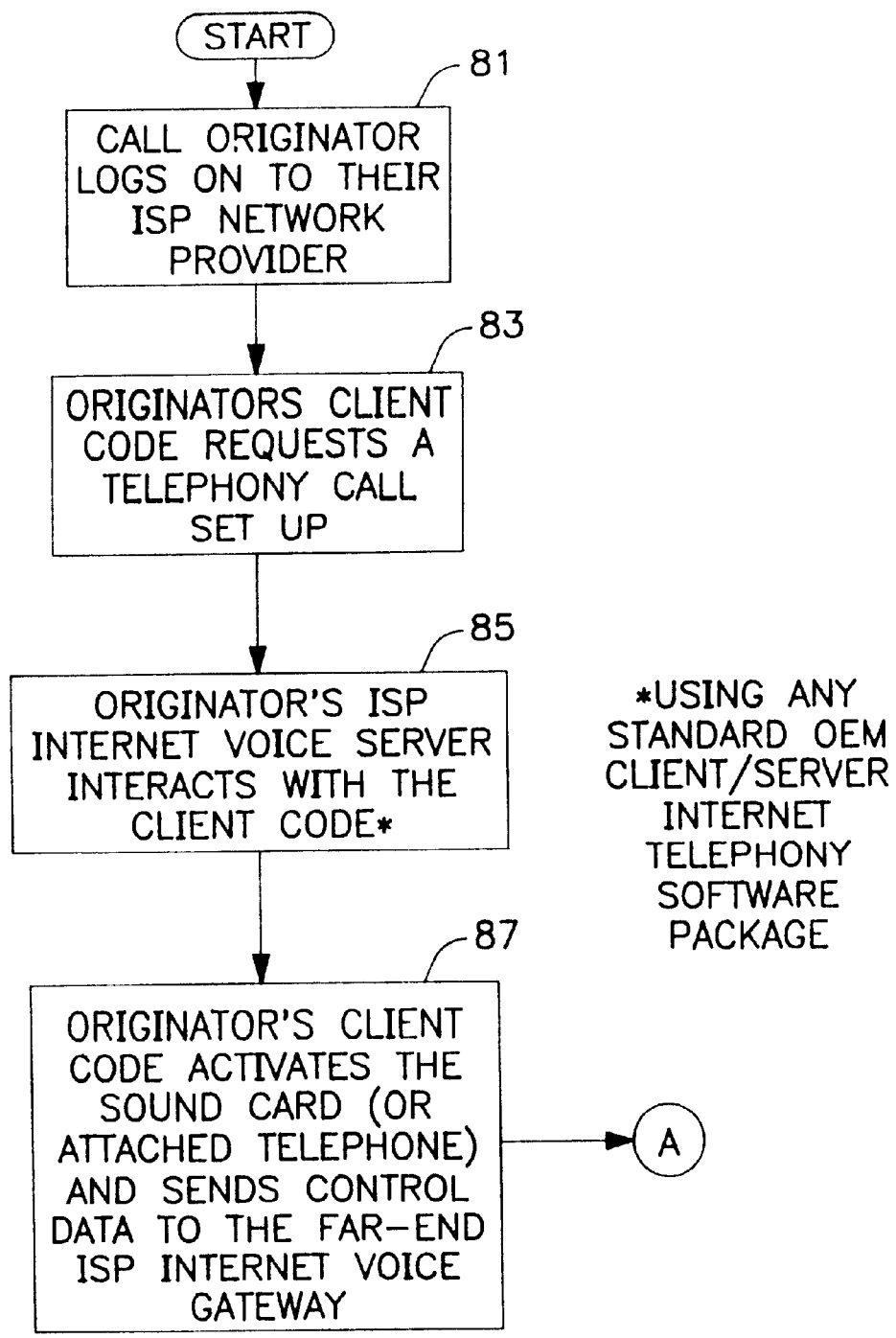
FIGS. 5A through 5E are a flow diagram for processing voice calls with callback between calling and called parties in the system of FIG. 2.
Figure 5B:
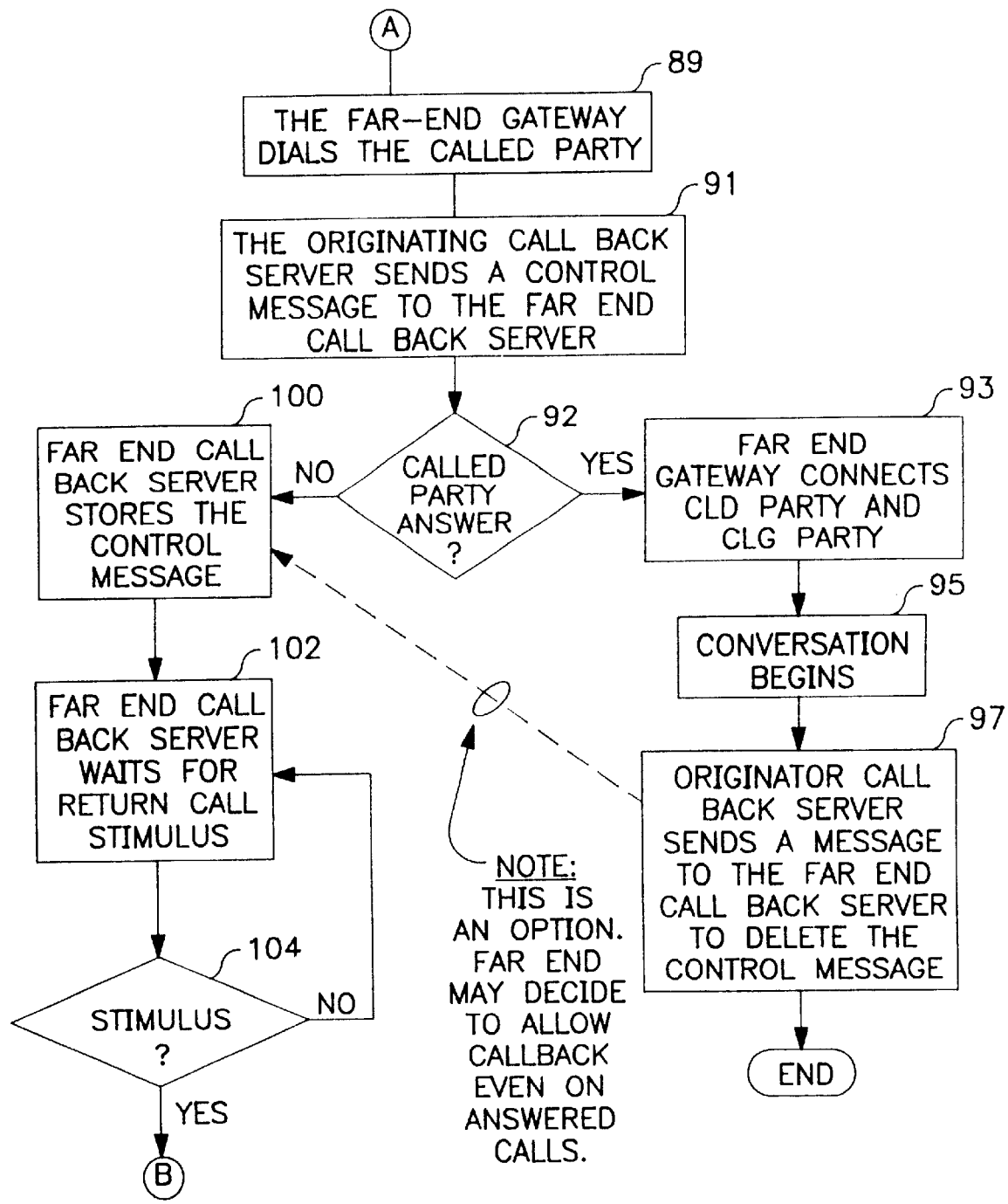

The operation of the invention shown in FIG. 2 in providing telephone service with callback and without DHCP effects for subscribers to a PSTN and Internet users will now be described in conjunction with FIGS. 5A–5E In FIG. 5A, Internet telephony with callback message flows is initiated in step 81 in which a call originator logs on to its ISP network provider 20. In a step 83, the ISP responds to the originator's client code request to set up a telephone call.

In step 85, the originator's ISP internet voice server interacts with the client code using any standard OEM client/server and internet telephony software package.

In step 87, the originator's client code activates the sound card in his computer or attached telephone and sends control data shown in FIG. 3B to the remote or far end ISP internet voice gateway 26'. The process continues in FIG. 5B at step 89 in which the gateway 26' dials the called party 12'.

In step 91, the originating callback server 28 sends the control message shown in FIG. 3B to the far end callback server 28'. A test 92 is performed to determine whether the called party has answered the originated call. A "yes" condition initiates a step 93 in which the far end gateway 27 connects the CLD Party and the CLG Party. Conversation begins in a step 95 and simultaneously in step 97 the originator callback server 28 sends a message (not shown) to the far end callback server to delete the control message shown in FIG. 3B, after which the process ends. Alternatively, step 97 may be include an option to allow the far end callback server to provide callback to the originating party even on answered calls by the called party.

Returning to test 92, a "no" condition initiates a step 100 in which the far end or remote callback server stores the control message and in a step 102, the far end or remote callback server goes into a waiting mode for a return call stimulus from the called party. As part of this waiting condition, the far end or remote callback server initiates a test condition 104 to determine if the called party has initiated a callback request. A "no" condition returns the process to step 102. A "yes" condition initiates a process in a step 106, shown in FIG. 5C, in which the local or remote callback server matches the incoming callback request from the called party with the stored control data from the original call from the calling party. Upon such matching condition, the local or remote callback server sends a return call message as shown in FIG. 4B to the original callback server in a step 108. In a step 110, the original ISP callback server responds to the message and matches its local callback record (shown in FIG. 3B) to the request and extends the call based on the user profile shown in FIG. 3A. A test 112 is performed to determine the delivery of return call over the internet. A "no" condition initiates a step 114, shown in FIG. 5D to pass the call to the internet voice gateway and dial the phone or voice mail number of the calling party. The calling party phone is rung in a step 115 and a test 116 is performed to determine if the phone is answered. A "yes" condition initiates a step 117 to route the voice packets from the called party and a caller ID is displayed on the computer if available. A conversation is established between the called and calling party in step 118 and in a step 120, shown in FIG. 5E, the originator callback server may re-send the control message 40 (See FIG. 3B) to the far end or remote callback server to activate the field 59 and delete the control message. The conversation begins in a step 122 after which the process ends.

Figure 5C:
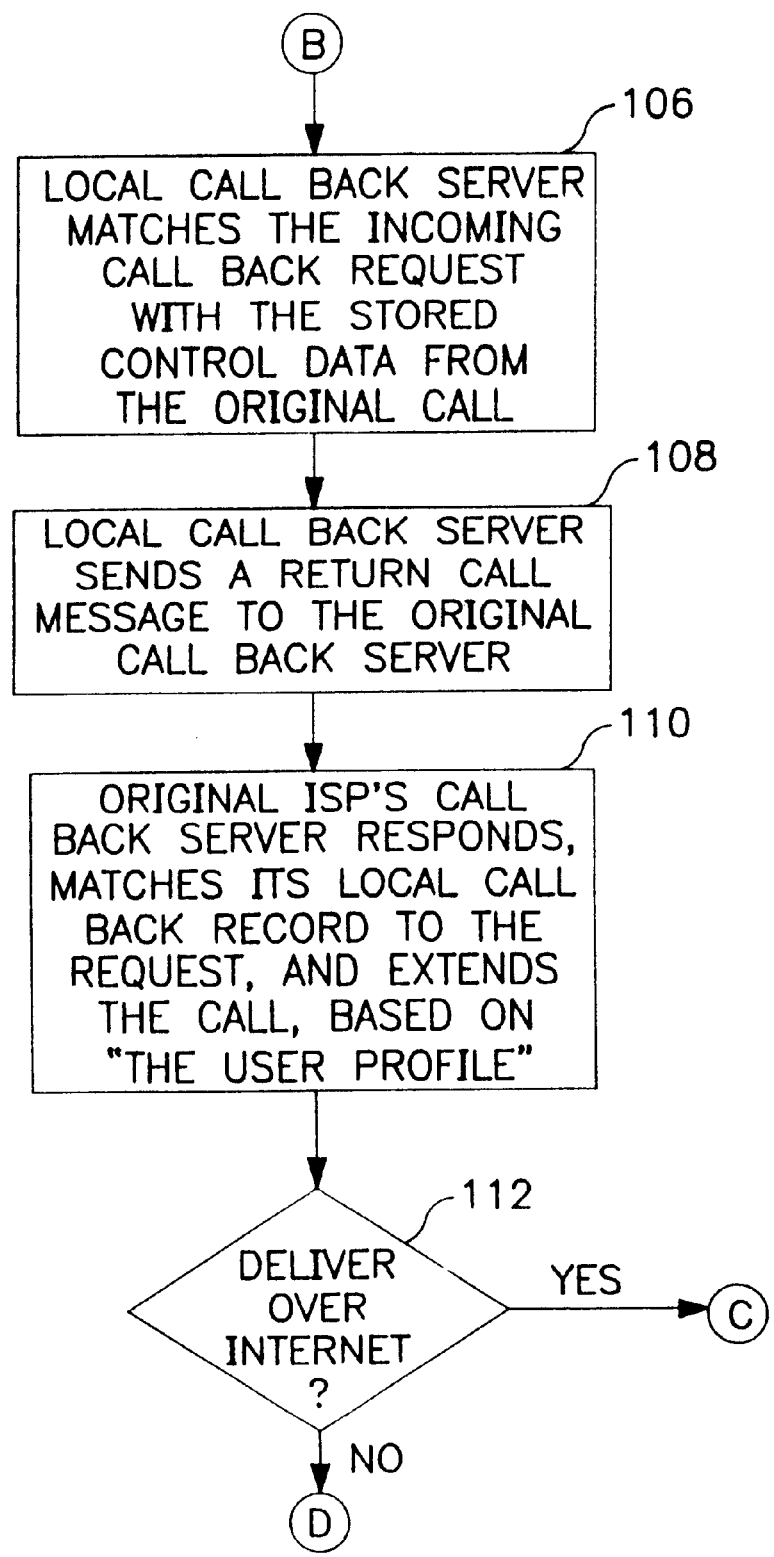
Figure 5D:
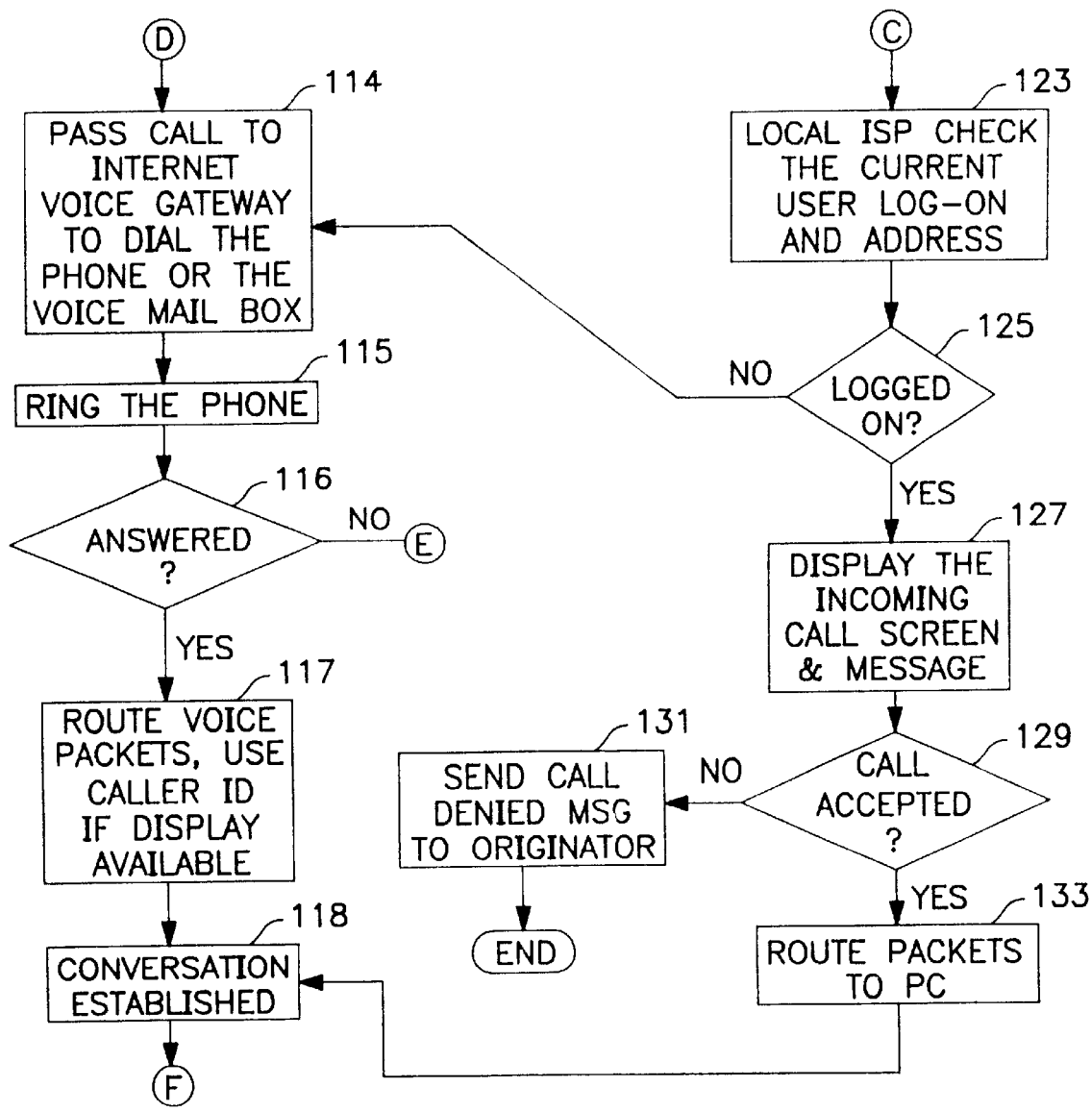
Figure 5E:
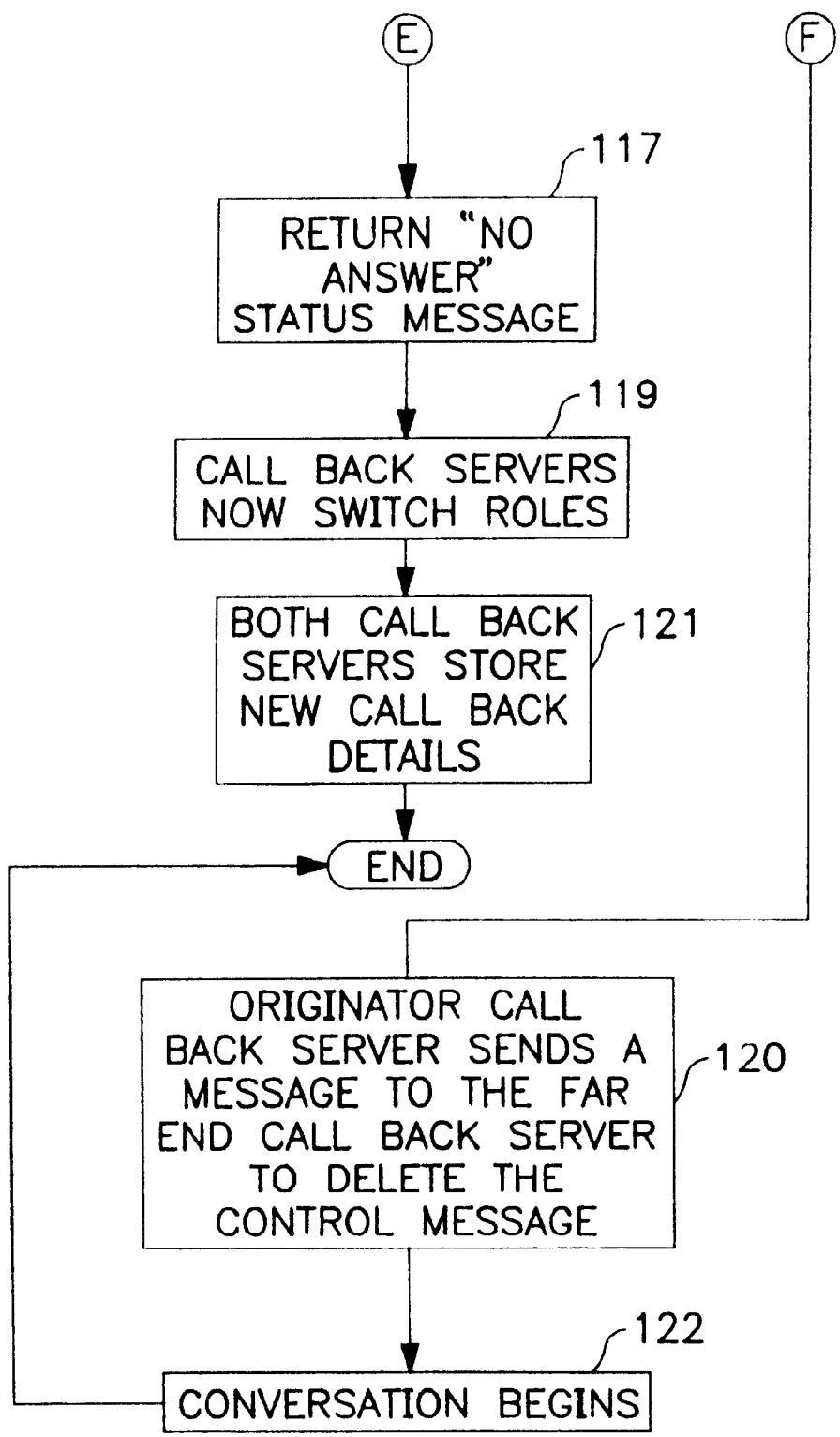

Returning to the test 116, a "no" condition initiates an operation 117 shown in FIG 5E in which a "no answer" status message is stored in the callback server. A step 119 is performed in which the called party callback server switches roles and both callback servers store new callback details in step 121 after which the process ends.

Returning to the test 112, shown in FIG. 5C, a "yes" condition initiates an operation 123, shown in FIG. 5D in which the local or remote ISP checks the current user log-on and address. A test 125 is performed to determine if the user is logged on. A "no" condition initiates step 114 and the process for delivery of the message over the internet begins as previously described. A "yes" condition for the test 125 initiates a step 127 to display the incoming call screen and message. A test 129 is performed to determine if the call is accepted. A "no" condition initiates a step 131 in which the send call is denied delivering a message to the originator after which the process ends. A "yes" condition initiates a step 133 to route the voice packets to the computer after which conversation is established in step 118 as previously described.

Summarizing, telephone service in the Internet has been improved by the addition of the callback server 28. Two basic functions are performed by he callback server depending on whether it is positioned in the originating ISP location or the terminating ISP location. For the callback function to work properly, there must be at least one server at each end of the session. Also, the callback server does not handle the actual voice packets, only the control information about those packets. The voice packets themselves flow through the Internet server as they do in the prior art. On the originating end, the callback server keeps a user profile as shown in FIG. 3A and sends a new control message (shown in FIG. 3B) that allows the far end or remote callback server to remember sufficient details about the call such that if it goes unanswered, the far end or remote server can help return the call at a later time. On the far end (the terminating ISP in the original placement of the call), the callback server sees that the incoming call is unanswered, and saves the call control message sent by the originating ISP. The data in the control message is paired with a user profile (shown in FIG. 4A) and identifies the called party. Other user profile data can be kept, depending on the specific services the ISP offers (such as pager notification of unanswered calls, in which case, the pager number would also be kept in the user profile). The terminating callback server eventually receives an incoming message from the end user from the called party asking to return the unanswered call. The request may come from a PC using a log-on to the ISP and a suitable screen message to the ISP; or it may come from a POTS phone that has dialed the ISP and is prompted to select a message to return. The latter could occur interactively while listening to voice mail or as a separate function based on simple recitation of stored message data identifying the original caller.

When this occurs, the callback server constructs a call return message addressed to the originator ISP. This message is used to identify a call placed past, and connect the caller to the originator, if possible. A return call message is used to accomplish this function. A typical return call message contains data extracted from the original call control message from the originator in the current user's profile.

At this point the original call party has returned a call to the original calling party, and the voice packets are handled by the Internet and the internet voice gateway servers on either or both ends deliver the message, depending on whether one or both ends uses a POTS phone.

While the invention has been shown and described in a preferred embodiment, various changes can be made without departing from the spirit and scope of the invention as defined in the appended claims, in which:

We claim:

1. An article of manufacture:
   a program medium, executable in a computer system, implementing callback for an unanswered telephone call between a called party and a calling party, comprising:

a) program instructions for initiating a telephone call between the calling party and the called party through the system;
b) program instructions for generating a unique call identifier number for tracking an address in a Dynamic Host Configuration Protocol used by the system;
c) program instructions for generating, storing and sending a control message in a calling station callback server from a calling station to a called station in conjunction with the telephone call;
d) program instructions for selecting between establishing a telephone connection between the calling party to the called party when the telephone call is answered by the called party and sending a message to delete the control message in the calling station callback server or storing the control message in a called station callback server when the telephone call is unanswered by the called party;
e) program instructions for generating a message from the calling station callback server to the called station callback server to remove the control message when the call is answered by the called party; and
f) program instructions for initiating a return call message to the calling party callback server for establishing a return call between the called party and the calling party in response to the stored control message in the called station callback server.

2. A program medium, executable in a computer system, implementing callback in an Internet telephony callback system for unanswered telephone calls between system users or between system users and subscribers in a public switched telephone system, comprising:
a) program instructions for a first service provider processing telephone calls in analog form originated by a calling party at a calling station;
b) program instruction for a first voice gateway transforming the analog telephone calls into digital signals definitive of the telephone calls;
c) program instruction generating a unique call identifier number for tracking an address in a Dynamic Host Configuration Protocol used by the system;
d) program instructions for a calling station callback server generating a control message accompanying the digital signals, the control message including a unique call identifier and a calling party profile;
e) program instructions for a second service provider; a second voice gateway and a called station callback server processing the digital signals into analog form for a called party at a called station when the called party answers the telephone call or saving the control message in the called station callback server when the telephone call is unanswered by the called party;
f) program instruction for generating a message from the calling station callback server to the called station callback server to remove the control message when the call is answered by the called party; and
g) program instructions initiating a call return message to the calling station callback server for establishment of a return telephone call between the called party and the calling party in response to the control message stored in the called station callback server.

3. A program medium, executing in a computer system including a first service provider and a second service provider, respectively, the first service provider including a first voice gateway and a calling station callback server, the second service provider including a second voice gateway and a called station callback server, the program medium implementing callback for an unanswered telephone call between a called party and a calling party, and comprising:
a) program instructions initiating a telephone call between the calling party and the called party through the system;
b) program instructions generating, storing and sending a control message in the calling station callback server from the calling station to a called station in conjunction with the telephone call;
c) program instructions selecting between establishing a telephone connection between the calling party to the called party when the telephone call is answered by the called party and sending a message to delete the control message in the calling station callback server or storing the control message when the telephone call is unanswered by the called party; and
d) program instructions initiating a return call message to the calling party callback server for establishing a return call between the called party and the calling party in response to the stored message.

4. The program medium of claim 3 further comprising:
e) program instructions generating a profile descriptive of an originating calling party for storage in the calling station callback server.

5. The program medium of claim 3 further comprising:
f) program instructions generating a profile descriptive a called party for storage in the called station callback server.

6. The program medium of claim 3 further comprising:
g) program instructions generating a message from the calling station to the called station callback server to remove the control message when the telephone call is answered by the called party.

7. The program medium of claim 3 further comprising:
h) program instruction generating a profile descriptive a calling party for storage in the calling station callback server.

8. The program medium of claim 3 further comprising the step of:
i) program instructions generating callback control message to the calling station when the called party desires to return a call to the calling party.

9. The program medium of claim 3 further comprising:
j) providing a called party with options for responding to the call when the call is unanswered.

10. The program medium of claim 3 further comprising:
k) program instruction updating an address in the system for the calling party when the call is unanswered.

11. The program medium of claim 3 further comprising:
l) program instructions informing the calling party that an unanswered call has been queued in a called party callback server.

12. The program medium of claim 3 further comprising:
m) program instructions generating a unique sequence number identifying a call from the calling party to a called party.

13. The program medium of claim 3 further comprising:
n) program instructions generating a unique call identifier number for tracking an address in a Dynamic Host Configuration Protocol used by the system.

14. A program medium, executable in a computer system, implementing callback in an Internet telephony callback system, for unanswered telephone calls between system users or between system users and subscribers in a public switched telephone system, comprising:

a) program instructions for a first Internet service provider in the system processing telephone calls in analog form originated by a calling party at a calling station;

b) program instructions for a first voice gateway in the system transforming the analog telephone calls into digital signals definitive of the telephone calls;

c) program instruction for a calling station callback server generating a control message accompanying the digital signals, the control message including a unique call identifier and a calling party profile including user calling party name, internet identification and telephone number;

d) program instruction for a second Internet service provider; a second voice gateway and a called station callback server processing the digital signals into analog form for a called party at a called station when the called party answers the telephone call or saving the control message in the called station callback server when the telephone call is unanswered by the called party; and e) program instruction initiating a call return message to the calling station callback server for establishment of a return telephone call between the called party and the calling party in response to the saved control message in the called station callback server.

15. The program medium of claim 14 further comprising:

f) program instructions generating a message from the calling station to the called station callback server to remove the control message when the call is answered by the called party.

16. The program medium of claim 14 further comprising:

g) program instructions generating callback control message to the calling station callback server when a user desires to return a call to the calling party.

17. The program medium of claim 14 further comprising:

h) program instructions providing a called party with options for responding to the call when the call is unanswered.

18. The program medium of claim 14 further comprising:

i) program instructions updating an address in the system for the calling party when the call is unanswered.

19. The program medium of claim 14 further comprising:

j) program instructions for informing the calling party that an unanswered call has been queued in the called station callback server.

20. The program medium of claim 14 further comprising:

k) program instructions for generating a unique sequence number identifying a call from a calling party to a called party.

21. The program medium of claim 14 further comprising:

l) program instructions for generating a unique call identifier number tracking an address in a Dynamic Host Configuration Protocol used by the system.

* * * * *